No. 727,071. PATENTED MAY 5, 1903.
S. T. H. BRADLEY.
MANUFACTURE OF BRICKS.
APPLICATION FILED OCT. 18, 1902.
NO MODEL. 2 SHEETS—SHEET 1.
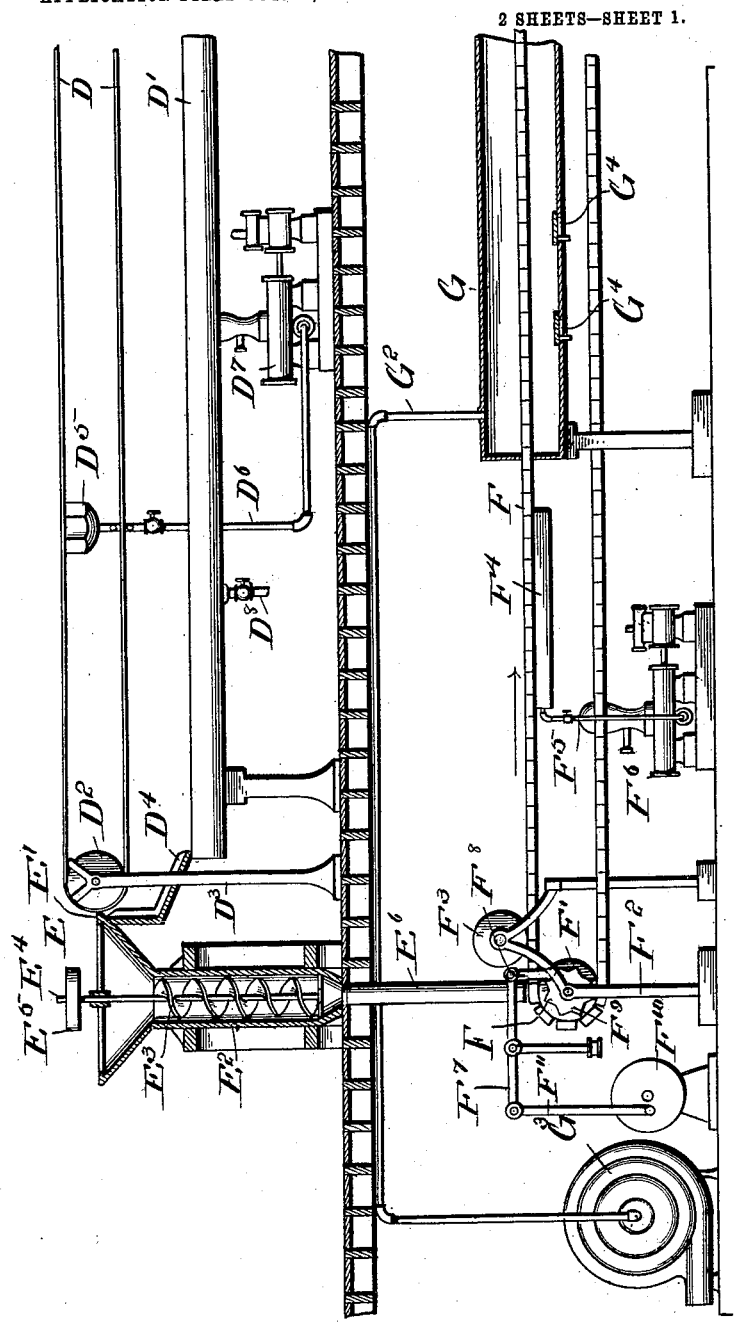
WITNESSES:
INVENTOR
Samuel T. H. Bradley.
BY
Attorney

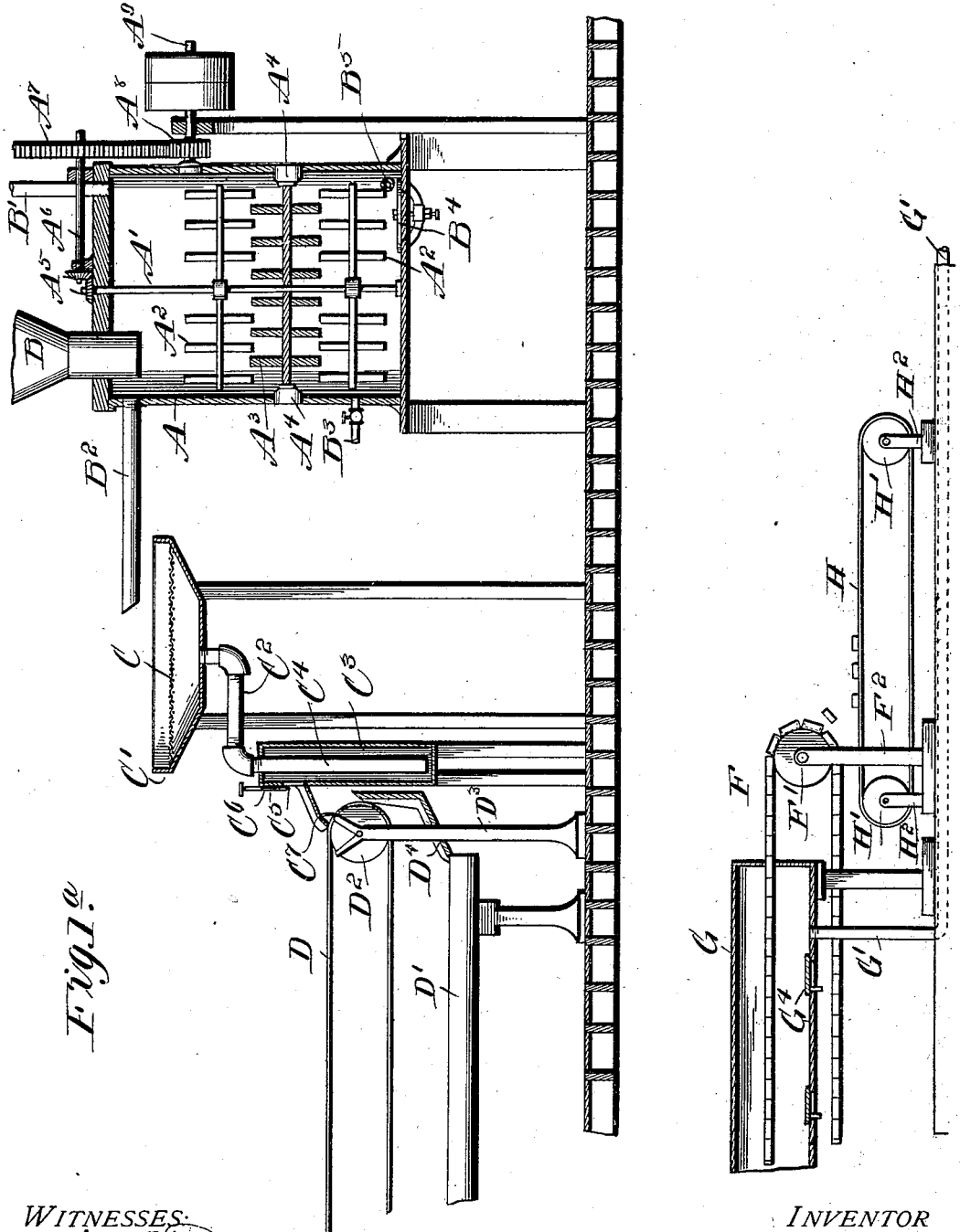

No. 727,071. Patented May 5, 1903.

UNITED STATES PATENT OFFICE.

SAMUEL THOMAS HARTILL BRADLEY, OF NEW ORLEANS, LOUISIANA.

MANUFACTURE OF BRICKS.

SPECIFICATION forming part of Letters Patent No. 727,071, dated May 5, 1903.

Application filed October 18, 1902. Serial No. 127,813. (No model.)

*To all whom it may concern:*

Be it known that I, SAMUEL THOMAS HARTILL BRADLEY, a citizen of the United States, residing at New Orleans, in the parish of Orleans, State of Louisiana, have invented certain new and useful Improvements in the Manufacture of Bricks, of which the following is a specification, reference being had therein to the accompanying drawings.

This invention relates to the manufacture of bricks, and particularly to means whereby the clay is mixed with water and afterward drained before the molding of the bricks.

The invention has for an object to provide means for forming a fluid mixture of the clay with water, then removing the water therefrom, and afterward molding and drying the brick in a continuous operation, whereby the capacity of a plant is materially increased and a more desirable product produced.

The invention has for a further object to provide novel means for effecting the mixture of clay and water, removing the water therefrom, molding the brick, and afterward drying the same prior to delivery for the usual burning operation in an ordinary kiln.

Other and further objects and advantages of the invention will be hereinafter set forth and the novel features thereof defined by the appended claims.

In the drawings, Figures 1 and 1ª represent a vertical section through an apparatus for effecting the objects of this invention, said figures being a combination of each other.

In the drawings, the letter A designates a mixing-tank of any suitable construction provided with a central shaft A', having secured thereon a series of stirrers $A^2$. Intermediate of these stirrers is a series of resisting-blades $A^3$, suitably held against movement by means of the sockets $A^4$ at opposite sides of the tank, thereby securing a more thorough disintegration of the clay in the movement thereof imparted by the stirrers. These stirrers are driven by any suitable form of gearing—for instance, beveled gears $A^5$ at the top of the tank, driven by a counter-shaft $A^6$, carrying a gear $A^7$, adapted to mesh with a pinion $A^8$ upon the driving-shaft $A^9$, which is provided with the ordinary fast and loose pulleys. The mixing-tank is provided with a feed-hopper B at its upper portion and also a water-inlet pipe B', while at one side thereof a delivery-pipe $B^2$ is located. At the lower portion of the tank a draw-off $B^3$ is provided for the water, and a manhole $B^4$ in the lower portion of the tank permits the removal of any lumpy matter or stones, which settle to the bottom owing to their greater specific gravity, while the fluid settlements upon the bottom of the tank may be withdrawn from a discharge-pipe $B^5$, if so desired.

The aqueous mixture is discharged from the pipe $B^2$ upon a screen C, carried by a pan C', and the strained mixture is conducted through the pipe $C^2$ into the box or trough $C^3$ by means of the pipe $C^4$, extending to the bottom thereof. This trough is provided at its upper portion with a discharge-opening $C^5$, controlled by a gate or valve $C^6$ and provided with a spout $C^7$, adapted to deliver material upon an endless belt D of porous or reticulated material, which permits the drainage of the water through the belt into the discharge-trough D' beneath the belt. This belt is mounted upon suitable driving-rolls $D^2$ at opposite ends, which are journaled in standards $D^3$ and driven by any suitable source of power, while at opposite ends of the belt conducting-plates $D^4$ are located for returning to the trough any water which may fall thereon. This belt D may be formed of any desired material—for instance, silk, cotton, wool, or perforated metal—and the mixture continuously carried thereon loses its water by drainage. To assist this draining action and deprive the mixture of all superfluous moisture, a suction-table $D^5$ is provided beneath the upper layer of the belt and connected by any suitable piping $D^6$ with any desired form of vacuum-pump, as indicated at $D^7$, while the water which may have drained in the trough D' is withdrawn therefrom by means of a discharge-pipe $D^8$. The clay thus prepared is then discharged into a hopper E, which is provided at its edge with a scraper E', lying adjacent to the belt, to remove the material therefrom. The lower portion of the hopper communicates with a conveyer-casing $E^2$, provided with a worm-blade $E^3$, carried upon the driving-shaft $E^4$, which shaft is provided with a driving-pulley E⁵ and driven from any suitable source of power. The material forced downward from the conveyer enters a die-tube E⁶, from which it is discharged into molds F, which are connected to form an endless belt or carrier thereof, passing beneath the die. This endless belt or carrier of molds is mounted upon driving-pulleys F', supported by means of standards F² of any desired construction, and is given an intermittent motion by any desired means—for instance, a walking-beam F⁷, carrying an arm F⁸ to engage a crown-wheel F⁹ on a pulley F', the beam being driven from a crank-wheel F¹⁰ by a pitman F¹¹, as shown. Adjacent to the die-tube is an impression-cylinder F³, lying above the molds, which impresses the desired trade-mark upon the brick and also levels and forces the material into the molds. The lower or under surface of these molds is formed of porous or reticulated material, and further moisture is removed from the soft bricks by means of the suction-chamber F⁴ beneath the upper layer of molds, which is connected by suitable piping F⁵ with a vacuum-pump F⁶ of any preferred construction. The upper layer of the mold-carrier after it passes this suction-chamber enters a drying or heating chamber G of any desired construction and length, the same being provided at one end with an inlet-pipe G', by which the chamber is heated by the products of combustion from a furnace or other fire, which fire-gases are drawn through the chamber by means of a pipe G², extending from an exhaust-fan G³, which fan may discharge at any suitable place. The chamber is also provided upon its lower surface with a series of dampers G⁴ in order that the temperature thereof may be regulated to maintain it at a uniform point by the admission of cooler air therein, it being desirable that the temperature should not fall below 212° Fahrenheit nor increase above 350° Fahrenheit. It has been found that the composition of the gases containing a large amount of carbon dioxid has a great influence upon the composition, durability, and finish of the brick, as any lime, as well as hydrated alumina, which may be present in the clay is converted into carbonates, which upon burning the brick are in turn converted into subcarbonates, the latter rendering the bricks waterproof. The heating-chamber therefore serves the purpose of rendering the bricks air dry and changing their chemical composition, thus producing a superior article by subjecting the same in a moist condition to the carbon-dioxid gases from a furnace or fire at any desired point. After leaving the heating-chamber the air-dried bricks are delivered upon a conveyer H, suitably mounted upon driving-rollers H', carried by standards H², from which conveyer they are transported in the usual manner to the ordinary drying-rooms, where the remaining moisture is removed, and then transferred to the kilns, where they are burned in the ordinary manner and the finished brick produced.

It will be observed that the operation of the apparatus is continuous and the time required to prepare the raw clay very much reduced, so that the product turned out is of a superior character and the manufacturer is independent of the weather conditions, a factor which in itself is of extreme importance in the present improved and continuous process. It will also be seen that the clay and water when mixed in the tank causes a disintegration of the raw clay, so that the silicates of ferri-ferrous oxid and alumina are suspended in the water, forming a dense turbid mixture, while all lumpy, silicious, or calcareous substances sink to the bottom of the tank by their greater specific gravity and may be removed therefrom. The water being continuously introduced into the tank causes the aqueous clay mixture to overflow from the discharge-pipe onto the screen, where further solid matter is retained. The screened and washed clay flows into the trough or box, from which the discharge is regulated by the gate or valve, said discharge passing upon the endless continuously-moving belt, which effects a removal of much of the water therefrom in the passage to the hopper and conveyer communicating with the die, thus thoroughly tempering the clay for brick-making purposes. The orifice at the lower end of the die is of the exact shape of the brick, and the moist clay forced therethrough enters the mold carried by the endless carrier, which mold may be moved by an intermittent or by a step-by-step movement. The filled molds first pass under the impression-cylinder, then over the suction-chamber to remove further moisture therefrom and render the mixture more dense. The molds carrying the bricks then enter the heating-chamber, where the material is affected by the products of combustion to produce the chemical action heretofore stated and finally delivered upon the conveyer.

It will be obvious that changes may be made in the details of construction and configuration of the several parts without departing from the spirit of the invention as defined by the appended claims.

Having described my invention and set forth its merits, what I claim, and desire to secure by Letters Patent, is—

1. In the manufacture of brick, means for forming a mixture of clay and water, means for extracting the water from said mixture, means for conveying the clay to a mold, and means for drying the clay, all of said means being relatively arranged to effect a continuous operation; substantially as specified.

2. In the manufacture of brick, means for forming a mixture of clay and water, means for extracting the water from said mixture during the movement thereof, means for conveying the clay to a mold, and means for drying the clay within the mold in the presence of products of combustion; substantially as specified.

3. In the manufacture of brick, a stirrer for forming a mixture of clay and water, a conveyer for extracting the water from said clay in the movement thereof, and means for delivering the clay from said conveyer to a mold; substantially as specified.

4. In the manufacture of brick, a stirrer for forming a mixture of clay and water, a conveyer for extracting the water from said clay in the movement thereof, means for delivering the clay from said conveyer to a mold, an endless carrier of molds beneath said delivery means, a drying-chamber through which said carrier passes, and means for heating said chamber; substantially as specified.

5. In the manufacture of brick, a stirrer for forming a mixture of clay and water, a conveyer for extracting the water from said clay in the movement thereof, means for delivering the clay from said conveyer to a mold, an endless carrier of molds beneath said delivery means, a drying-chamber through which said carrier passes, means for heating said chamber, a straining device located between said stirrer and conveyer to deliver upon the latter, and a suction-table beneath a surface of said conveyer; substantially as specified.

6. In the manufacture of brick, a stirrer for forming a mixture of clay and water, a conveyer for extracting the water from said clay in the movement thereof, means for delivering the clay from said conveyer to a mold, an endless carrier of molds beneath said delivery means, a drying-chamber through which said carrier passes, means for heating said chamber, a straining device located between said stirrer and conveyer to deliver upon the latter, a suction-table beneath a surface of said conveyer, and a suction-chamber beneath said endless carrier of molds; substantially as specified.

7. In the manufacture of brick, a stirrer for forming a mixture of clay and water, a conveyer for extracting the water from said clay in the movement thereof, means for delivering the clay from said conveyer to a mold, an endless carrier of molds beneath said delivery means, a drying-chamber through which said carrier passes, means for heating said chamber, a straining device located between said stirrer and conveyer to deliver upon the latter, a suction-table beneath a surface of said conveyer, a suction-chamber beneath said endless carrier of molds, an exhaust-fan communicating with said heating-chamber, dampers in a wall of said chamber, and a delivery-belt to receive completed bricks from said mold-carrier; substantially as specified.

8. In the manufacture of brick, a stirrer for forming a mixture of clay and water, a conveyer for extracting the water from said clay in the movement thereof, means for delivering the clay from said conveyer to a mold, an endless carrier of molds beneath said delivery means, a drying-chamber through which said carrier passes, means for heating said chamber, a straining device located between said stirrer and conveyer to deliver upon the latter, a suction-table beneath a surface of said conveyer, a suction-chamber beneath said endless carrier of molds, an exhaust-fan communicating with said heating-chamber, dampers in a wall of said chamber, a delivery-belt to receive completed bricks from said mold-carrier, a feeding box or trough adapted to discharge onto said conveyer, and an inlet-pipe from said straining device extending to the lower portion of said box; substantially as specified.

9. In the manufacture of brick, the combination of a mixing device for clay and water comprising a tank, stirrers rotatably mounted therein, fixed resisting-blades fixed intermediate of said stirrers, a water-inlet pipe, a clay-hopper, a discharge-pipe at the upper portion of the tank for the aqueous mixture, means for extracting the water from said mixture, means for conveying the clay to a mold, and means for drying the clay; substantially as specified.

10. In the manufacture of brick, the combination of a mixer for producing an aqueous mixture comprising a pan and screen therein, a feeding-box beneath said pan, a discharge at the upper portion of said box, and a conducting-pipe from the pan to the lower portion of said box; means for extracting the water from said mixture; means for conveying the solid matter to a mold; and means for drying said matter; substantially as specified.

11. In the manufacture of brick, means for effecting a mixture of clay and water, and an endless belt adapted to permit the drainage of water therethrough and to convey said clay to a point of delivery; substantially as specified.

12. In the manufacture of brick, means for effecting a mixture of clay and water, an endless belt adapted to permit the drainage of water therethrough and to convey said clay to a point of delivery, and a suction-table disposed beneath the upper layer of said belt; substantially as specified.

13. In the manufacture of brick, means for effecting a mixture of clay and water, an endless belt adapted to permit the drainage of water therethrough and to convey said clay to a point of delivery, a suction-table disposed beneath the upper layer of said belt, a trough beneath said belt, a hopper to receive material from said belt, a conveyer at the lower portion of said hopper, a die communicating with said conveyer, and a mold to coöperate with said die; substantially as specified.

14. In the manufacture of brick, means for producing a mixture of clay and water, means for extracting the water therefrom, means for conveying the moist clay to a die, an endless mold-carrier adapted to travel beneath the delivery-orifice of said die, a heating-chamber through which the upper layer of said mold-carrier passes, and means for effecting the passage of products of combustion through said chamber; substantially as specified.

15. In the manufacture of brick, means for producing a mixture of clay and water, means for extracting the water therefrom, means for conveying the moist clay to a die, an endless mold-carrier adapted to travel beneath the delivery-orifice of said die, a heating-chamber through which the upper layer of said mold-carrier passes, means for effecting the passage of products of combustion through said chamber, a suction-table beneath the upper layer of said mold-carrier, and means for regulating the temperature of said chamber; substantially as specified.

16. In the manufacture of brick, means for producing a mixture of clay and water, means for extracting the water therefrom, means for conveying clay in a moist condition to a mold, a heating-chamber communicating with a source of carbon dioxid, and means for introducing the mold carrying a moist brick into said chamber; substantially as specified.

In testimony whereof I affix my signature in presence of two witnesses.

SAMUEL THOMAS HARTILL BRADLEY.

Witnesses:
O. PLATT,
J. DUNN.